Dec. 8, 1964 G. F. QUITTNER 3,160,804
DIRECT CURRENT MOTORS
Filed May 16, 1960

G. F. Quittner

United States Patent Office 3,160,804
Patented Dec. 8, 1964

3,160,804
DIRECT CURRENT MOTORS
George Franklin Quittner, 1780 Cumberland Road,
Cleveland Heights, Ohio
Filed May 16, 1960, Ser. No. 29,482
3 Claims. (Cl. 318—138)

My invention relates to direct current powered motors, and more particularly to a new and useful system for alternating the stator flux of permanent magnet rotor direct current motors so that no mechanical contacts or brushes are required.

The direct current motor is well known for having superior torque-to-inertia and power-efficiency characteristics, and for working well in systems involving chemical batteries and other moderately low voltage sources, but due to the necessity for brushes and commutators its use has been limited. Various means have been proposed for circumventing these disadvantages, including the use of systems involving both A.C. and D.C. power and conversion devices, and, for example, the use of transistors and/or vacuum tubes with special rotor position sensing elements such as are disclosed in U.S. Patents 2,719,944 (Brailsford) and 2,929,008 (Wilcox), but my invention is significantly simpler both electrically and mechanically. Because my invention is well adapted to use of semiconductor devices, it is inherently reliable, and also can be used with substantial modification with low supply voltages such as are generated by chemical batteries, solar cells, thermoelectric generators, fuel cells, and magneto-hydrodynamic generators. It is also well adapted to inexpensive mass production and practical levels of output power.

My invention, then, is a motor to be powered by a direct current supply, having a permanent magnet rotor and a coil energized stator whose flux direction is alternated every time a rotor pole passes a stator pole, by a bistable electronic switch whose electrical condition is automatically reversed by the E.M.F. changes induced in the stator energizing coils as the rotor passes the stator poles.

It is an object of this invention to provide a direct current powered motor without mechanical or sliding contacts.

It is a further object of this invention to provide a direct current powered motor of improved simplicity and reliability.

It is a further object of this invention to provide a direct current powered motor suited to inexpensive manufacture.

It is a further object of this invention to provide a direct current powered motor suited to being powered by relatively low voltage sources without sacrifice of reliability.

It is a further object of this invention to provide a direct current powered motor which will usefully rotate in either direction without requiring reversal of supply current polarity.

It is a further object of this invention to provide a reliable, inexpensive direct current motor suited to miniaturization.

Other objects and advantages of my invention will be apparent and suggested to those skilled in the art to which the invention is directed by reading the following specifications and examining the accompanying drawings, in which.

In conventional direct current powered motors having commutators and brushes, the rotor customarily is made of laminated magnetically soft material, and has a plurality of coils wound on the rotor and connected to commutator segments which revolve with the rotor. Stationary brushes are used to convey electrical power to the proper segments in consecutive order so that as the rotor turns, new coils are consecutively energized and the old ones deenergized. This, in effect, produces a nearly stationary magnetic field in the rotor to interact with the stationary stator field, which in turn produces continuous mechanical motion of the rotor.

Figure 2:
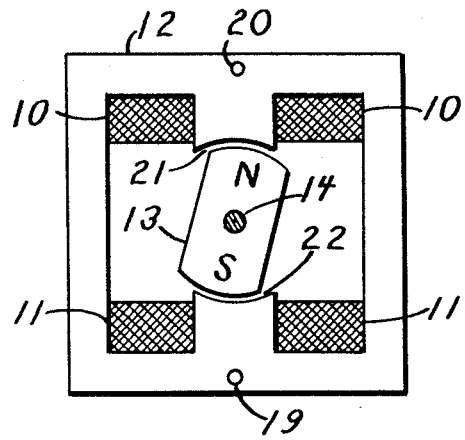
FIG. 2 is a transaxial view of a motor embodying the principles of my invention, showing the rotor, stator and the stator energizing coils.

One form of conventional alternating current powered synchronous motor employs a permanent magnet rotor and a stator arrangement which in simplified form is similar to that illustrated in FIG. 2. In fact, if an alternating current source is connected to coils 10 and 11 (the coils being interconnected so that the generated magnetomotive force is in series, aiding) of a motor constructed exactly as shown in FIG. 2, synchronous motor operation will be obtained. The rotor speed must be almost exactly synchronous before the motor will be self-powered, and the torque characteristics will be very poor. Why such a motor will so operate is easily explained: At any instantaneous combination of rotor position and stator pole energization, the rotor N and S poles will be urged by magnetic attraction and repulsion toward the S and N stator poles respectively. If, then, stator polarization direction is reversed at approximately the time the sought relation is achieved by rotor rotation, the rotor will be urged onward through another 180 angular rotational degrees, at which time stator polarization will again reverse if rotor speed is correct. Because of the relatively slow rate of rise if sine wave excitation, the torque of such a motor is low. Further, no "slippage" or asynchronism beyond 180 angular degrees can be tolerated without great loss of torque, stoppage or even reversal.

From the above description a direct current powered motor can be easily visualized with operation similar to the synchronous motor, in which stator polarization alternations are produced by a switch mechanically driven by the rotor shaft. Because of the mechanical connection between the rotor and the switch, such a motor "always is synchronized" except when the switch is open and the stator unenergized. Such a "dead-center" position would have to be provided to avoid momentarily short circuiting the power supply at each switch reversal with consequent arcing. Such a motor would have much more useful torque characteristics than the sine wave powered synchronous motor because of its square wave excitation, and because of the fact that when slowed down the average current drawn would rise due to reduction in back E.M.F. and sustain the torque. I have discovered a particularly simple and effective way to produce switching action similar to that just described, without using any mechanical or sliding contacts at all.

Figure 1:
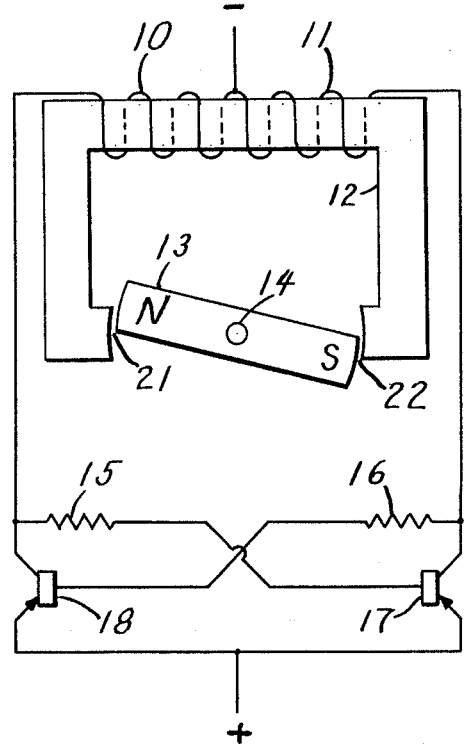
FIG. 1 is a schematic drawing illustrating the basic electromagnetic and electrical principles embodied in my invention.

Referring to FIG. 1, a preferably laminated, poled, stator structure of magnetically soft material, 12, is schematically represented, and the stator energizing coils 10 and 11 are positioned to usefully excite magnetomotive force in the stator. Since the negative power supply terminal is connected to both coils, which are wound in the same direction, if coil 10 is energized by connection of the other end to the positive power supply terminal, magnetomotive force will be excited in one direction, whereas if alternatively coil 11 is so connected magnetomotive force will be excited in the opposite direction.

A permanently magnetized rotor 13, is mounted on a supporting axle 14, which is rotatably held in conventionally mounted anti-friction bearings (not shown), so a flux path exists through the stator, air gaps 21 and 22, and the rotor magnet 13. An extension of axle 14 may be used to transmit mechanical power usefully to other devices to be driven by the motor.

In the particular schematic embodiment of my invention shown here, the outer ends of coils 10 and 11 are connected to the collectors of transistors 17 and 18, whose emitters are, in turn, connected to the positive power supply terminal. The bases of transistors 17 and 18 are connected through resistors 15 and 16 to the collectors of their opposites.

Although there are other circuit arrangements with which my invention can be practised, I have found the one illustrated and described to be particularly advantageous, and therefore will proceed to describe its operation minutely.

Suppose that when the power supply is first connected, the rotor is stationary and transistor 18 has slightly lower collector to emitter resistance than transistor 17. As a result of the difference in internal transistor resistance, slightly more current will pass through coil 10 than coil 11, so that the voltage at the junction of resistor 16 and coil 11 will be negatively greater than that at the junction of resistor 15 and coil 10. This is necessarily true since all real coils have significant D.C. resistance. This condition causes more current to flow in the base to emitter path of transistor 18 than 17, which further increases the differences in base forward bias. The endpoint of this series of changes is that transistor 18 is conducting heavily through coil 10, whereas transistor 17 is conducting only negligibly through coil 11. Approximately, then, switching transistor 18 is "closed" and transistor 17 "open."

If rotor 13 is now set into rotation, and selecting first for examination a rotor position in that portion of its full rotary travel when coil 10 is energized and coil 11 not energized, and the magnetic flux is urging the rotor to complete this portion of its cycle, it is noted that the motion of the rotor within the stator is such as to generate back E.M.F. in coil 10 (energized) and forward E.M.F. in coil 11 (not energized) proportional to the rate of change of flux at that instant in the stator flux circuit. The back E.M.F. in coil 10 tends to reduce the current flow through it, but the forward E.M.F. in coil 11 can have little effect in increasing current flow because the resistance of transistor 17 is now high, as explained above.

The second rotor position we select for examination is the one where the rotor has just achieved the position toward which the magnetic forces are urging it, and only its momentum tends to continue its movement. At this point the rate of change of flux in the stator is passing through zero, because the air gaps 21 and 22 are passing through minima and the magnetic path reluctance is minimum. Rotor N pole faces stator S pole, and rotor S pole faces stator N pole. As this position is passed due to rotor momentum, back E.M.F. begins to develop in coil 11, and forward E.M.F. in coil 10. Whereas transistor 18 is still conducting heavily, so that the forward E.M.F. in coil 10 faces a low impedance circuit through that transistor and the power supply, transistor 17 is still not conducting, and the back E.M.F. in coil 11 faces a high impedance in that branch of the circuit including transistor 17 and the power supply. However, coil 11 faces a relatively lower impedance in the circuit through resistor 16, thorugh the base and emitter of transistor 18, and coil 10. The back E.M.F. now generated in coil 11 may be thought of as generated by a zero internal resistance battery which in effect has been interposed between coil 11 and the intersection of resistor 16 with the collector lead of transistor 17, with its positive terminal facing that intersection and its negative terminal facing coil 11. The back E.M.F. in coil 11 is doubled by series aiding addition of the forward E.M.F. in coil 10, resulting in a decrease of the base forward bias current of transistor 18. Once this process of multivibrator state-changing is initiated, as in conventional "flip-flop" (bistable multivibrator) circuits, it is self-perpetuating, just as the process perpetuated itself when the power supply was first connected with the rotor stopped, and is completed with transistor 17 conducting heavily and transistor 18 essentially not conducting.

It is evident that following the change of electrical state, the magnetomotive force excited by the stator energizing coils 10 and 11 is reversed, and the rotor will be magnetically urged toward an angular position 180 degrees away from that toward which it was just previously being urged. It will further be evident that what will occur when that position is achieved will be analogous in all respects to what has just been described, causing transistor 18 to again conduct and transistor 17 to again not conduct.

Once this mode of operation is understood, it will be seen that various alternative circuits and components and schemes can be devised by those skilled in the art to produce the same essential results. It also will be evident that various refinements and modifications of the original circuit can be made without exceeding the scope and purpose of my invention. For example, rectifying diodes or nonlinear resistors can be used to shunt the exciting coils 10 and 11 to protect the transistors against transient voltage surges resulting from the rapid switching of current through the inductive load. Similarly, resistors 15 and 16 can be shunted by condensers, to increase switching speed. Similarly, for some applications, it may be desirable to add a resistor from each transistor base to the emitters, to stabilize biasing, or from each base to a bias bus permitting exact bias regulation. The preferred switching circuit described is inherently a new (coil-resistance loaded) form of what is usually classified as a "multivibrator" circuit, of which many varieties are well known to those familiar with the art, so that common base or common collector or various combination circuits could be used, and the basic idea is usable with other types of active elements such as vacuum tubes, gas filled tubes, magnetic amplifiers, relays, and so-called "avalanche effect" semi-conducting devices, etc. As is well known, a multivibrator comprises two signal responsive devices each constituted or arranged to be individually either highly conductive or highly non-conductive a large percentage of the time, each device being connected through so-called load resistances to an arrangement for supplying power to the devices, with interconnections for causing either of the signal responsive devices to be conductive when the other is non-conductive.

In experimenting with the arrangment shown in FIG. 1, I have found that adjustment of the values of resistors 15 and 16 affects circuit conditions significantly. If resistors 15 and 16 have very low resistance, or are shorted out, maximally stable multivibrator conditions prevail, and relatively high rotor speeds are required to cause the described switching operation and continuous motor operation. On the other hand, the values of resistors 15 and 16 may be increased past a critical value at which the circuits begin self-sustained oscillation, in which case the motor starts very easily at low rotor speed, but has less torque due to reduced average current flow; however, in this condition the rotor still is controlling the switching, by the inductive process described, rather than running synchronously (with consequently limited range of operating speed while producing usable torque) as determined by circuit natural electrical time constants. Optimum resistor value adjustment for many purposes appears to be just below the value at which self-oscillation occurs, for easy, low speed, starting and good torque. Although the motor is operable without resistor adjustment over a quite broad voltage range (in excess of 50% to 150% of the supply voltage for which the resistors are adjusted), changes in transistors, supply voltage and internal resistance, and coil resistance and inductance significantly affect circuit operation. Because the transistors are used as switches rather than current modulators, power dissipation in the transistors is low, and considerably more motor wattage may be handled than particular transistor wattage dissipation ratings suggest.

It has been shown that in accordance with my invention no special sensing windings or structures are required, that switching is controlled by rotor position in very much the same manner it would be if mechanical switching by rotor position were used. This being the case, very simple, inexpensive and conventional practical structures may be used to practise my invention.

In FIG. 2 is shown a trans-axial cross section of a practical embodiment of my invention. The supporting structure for mounting the bearings and stator are not illustrated, being conventional. The stator 12 consists of an axial pile-up of stamped laminations, assembled on rods passing through par-axial holes such as 19 and 20 for alignment and support purposes. Prewound coils such as 10 and 11 may be slipped onto the stator pole extensions facing air gaps such as 21 and 22, and cemented or otherwise fastened in place. The permanent magnet rotor 13 and the support axle 14 are quite conventional, being very similar to rotor assemblies often used in rotating permanent magnet A.C. generators. Connections to coils 10 and 11 of FIG. 2 are as shown in FIG. 1.

Figure 3:
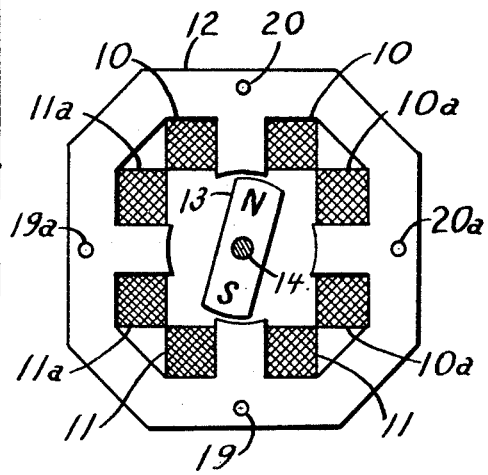
FIG. 3 is a transaxial view of another motor design embodying the principles of my invention, showing the rotor, stator, and the stator energizing coils.

FIG. 3 is a view similar to FIG. 2 of another practical embodiment of my invention, in which another pair of poles is used having energizing windings 10a and 11a which are connected to another transistor and resistor pair (which, for brevity, are not shown, since the connections and operation are exactly alike although not simultaneous with that already discussed). Holes 19a and 20a are, like holes 19 and 20, for alignment and support purposes. This second set of coils 10a and 11a also is switched in accordance with rotor position relative to the poles they energize, independently of any action in coils 10 and 11, but adding to the torque and smoothness of motor operation. Similarly, additional coils, stator poles and switching circuits may be added as desired, with automatic cooperation occuring between them due to the individual control of each by rotor position, for various motor performance requirements, without exceeding the scope and purpose of my invention.

No mention has heretofor been made in this specification of means for starting motor built according to my invention. I have found that if the unloaded rotor is released from a position midway between "dead-center" positions, the motor will self-start, and this principle can be embodied in automatic starting arrangements, but the direction will depend on which rest position it was minutely closer to at the time of release, the degree of synchronism between releasing and closing the power supply circuit, as well as into which electrical state the initial power surge sets the switching transistors. Various mechanical and electrical arrangements for starting the motor will be evident to those skilled in the art.

What I claim is:
1. In combination, a motor having:
 a stator provided with salient poles and with at least first and second pole energizing windings,
 a rotor rotationally cooperable with said stator, said rotor being magnetically polarized whereby to react with the stator poles while at the same time permitting said energizing windings to sense position of said rotor,
 a D.C. source of power,
 first and second electronic amplifiers each having a load circuit and a control circuit,
 first circuit connections leading through the first stator pole energizing winding and through the load circuit of the first amplifier and thus to the power source,
 second circuit connections leading through the second stator pole energizing winding and the load circuit of the second amplifier and thus to the power source,
 said first and second circuit connections thus being capable of both sensing the position of the rotor with respect to the associate stator pole energizing winding and sensing the output of the associate amplifier,
 third circuit connections from the control circuit of the first amplifier to a portion of the first circuit connections, and
 fourth circuit connections from the control circuit of the second amplifier to a portion of the first circuit connections,
 whereby the flux generated in the stator may be sequentially reversed while the load circuits and control circuits are cross connected in bi-stable multivibrator fashion causing the flux reversals to be governed by signals generated in the stator windings by the rotation of the polarized rotor.

2. A motor as in claim 1 further characterized by the arrangement being duplicated so that there are at least two pairs of salient poles and stator coils for respectively energizing said poles, and amplifier pairs corresponding in number to the stator pole pairs with each pair of amplifiers characterized by having each amplifier control circuit cross connected to the load circuit of the other amplifier of the same pair, the flux generated in each pair of poles being thus reversed at times depending upon rotor position, whereby each such amplifier pair is intercoupled and synchronized for signals by means of the mechanical position of the rotor with respect to the stator coils connected to the amplifiers of that amplifier pair.

3. A motor as in claim 1 further characterized by the third circuit connections comprising an intercoupling resistor and the fourth circuit connections comprising an intercoupling resistor, said intercoupling resistors being selected in resistance value to yield the condition of bi-stability for the amplifier pair comprising said first and second electronic amplifiers.

References Cited in the file of this patent
UNITED STATES PATENTS

| | | |
|---|---|---|
| 2,719,944 | Brailsford | Oct. 4, 1955 |
| 2,753,501 | Brailsford | July 3, 1956 |
| 2,786,972 | Dreier et al. | Mar. 26, 1957 |
| 2,810,843 | Grandqvist | Oct. 22, 1957 |
| 2,814,769 | Williams | Nov. 26, 1957 |
| 2,912,653 | Tillman | Nov. 10, 1959 |
| 2,995,690 | Lemon | Aug. 8, 1961 |
| 3,025,443 | Wilkinson | Mar. 13, 1962 |
| 3,036,221 | Kleinschmidt | May 22, 1962 |
| 3,037,171 | Cerofolini | May 29, 1962 |
| 3,098,958 | Katz | July 23, 1963 |

UNITED STATES PATENT OFFICE
CERTIFICATE OF CORRECTION

Patent No. 3,160,804                                   December 8, 1964

George Franklin Quittner

It is hereby certified that error appears in the above numbered patent requiring correction and that the said Letters Patent should read as corrected below.

Column 6, line 19, for "first circuit" read -- second circuit --.

Signed and sealed this 27th day of April 1965.

(SEAL)
Attest:

ERNEST W. SWIDER
Attesting Officer

EDWARD J. BRENNER
Commissioner of Patents